(12) United States Patent
Naik et al.

(10) Patent No.: US 8,099,179 B2
(45) Date of Patent: Jan. 17, 2012

(54) FAULT TOLERANT CONTROL SYSTEM

(75) Inventors: Sanjeev M. Naik, Troy, MI (US);
Pradyumna K. Mishra, Novi, MI (US);
Soila M. Pertet, Pittsburgh, PA (US)

(73) Assignee: GM Global Technology Operations LLC, Detroit, MI (US)

( * ) Notice: Subject to any disclaimer, the term of this patent is extended or adjusted under 35 U.S.C. 154(b) by 15 days.

(21) Appl. No.: 11/223,400

(22) Filed: Sep. 9, 2005

(65) Prior Publication Data

US 2006/0074500 A1   Apr. 6, 2006

Related U.S. Application Data

(60) Provisional application No. 60/608,684, filed on Sep. 10, 2004.

(51) Int. Cl.
*G05B 11/01* (2006.01)

(52) U.S. Cl. ............ 700/21; 700/79; 700/80; 700/210; 303/177; 701/74; 701/93; 180/65.225; 903/916; 903/919; 903/945

(58) Field of Classification Search .............. 700/21, 700/79, 80, 210; 303/177; 701/74, 93; 180/65.225; 903/916, 919, 945
See application file for complete search history.

(56) References Cited

U.S. PATENT DOCUMENTS

| 5,481,194 | A  | * | 1/1996  | Schantz et al. ............... 324/522 |
| 5,508,594 | A  | * | 4/1996  | Underwood et al. .......... 318/139 |
| 6,390,565 | B2 | * | 5/2002  | Riddiford et al. ................ 303/3 |
| 6,398,319 | B1 | * | 6/2002  | Wilson et al. ............ 303/122.03 |
| 6,484,833 | B1 | * | 11/2002 | Chhaya et al. ........... 180/65.225 |
| 6,665,596 | B2 | * | 12/2003 | Bauer et al. ..................... 701/33 |
| 6,684,146 | B1 | * | 1/2004  | Hedenetz ........................ 701/70 |
| 6,885,922 | B2 | * | 4/2005  | Yao et al. ........................ 701/29 |
| 6,935,449 | B2 | * | 8/2005  | Chernoff et al. ............. 180/65.1 |
| 2003/0043739 | A1 | * | 3/2003 | Reinold et al. ................ 370/228 |
| 2003/0230443 | A1 | * | 12/2003 | Cramer et al. ............... 180/65.5 |

OTHER PUBLICATIONS

Poledna et al., Communication Bus for Automotive Applications. Jun. 2001.*
Joe LoGrasso et al., "Low Power Flexible Controls Architecture for General Motors Partnership for a New Generation (PNGV) Precept Vehicle", 2000 Society of Automotive Engineers, Inc., vol. 2000-01-C060, pp. 1-15.*
Dr. Timothy Lipman et al., "Hybrid Electric and Fuel Cell Vehicle Technological Innovation: Hybrid and Zero-Emission Vehicle Technology Links", Submitted to the 20th International Electric Vehicle Symposium and Exposition, Nov. 15-19, 2003, Long Beach, California.*
How GM"S Hy-Wire Works, http://www.howstuffworks.com/hy-wire.htm/printalbe, Dec. 2002, 10 pages.*
Xiaolai He, "Low Voltage System Design in Fuel-Cell Powered Vehicle" A Thesis in Electrical Engineering, Aug. 2003, pp. 1-97.*

* cited by examiner

*Primary Examiner* — Kakali Chaki
*Assistant Examiner* — Tejal J Gami

(57) ABSTRACT

A dual-redundant propulsion-by-wire control architecture with robust monitoring is presented to increase system availability without compromising safety. The dual-redundant controllers are able to cross-monitor and self-monitor. Self monitoring is effected at the application level and built-in system tests are performed. The monitor functions are set as high priority tasks. The first controller controls operation of a first propulsion system, monitors operation of a second controller, and, self-monitors. The second controller controls operation of a second propulsion system, monitors operation of the first controller, and, self-monitors. Each controller is operable to identify faults occurring in the first and the second controller, and implement an alternate operating control scheme for the respective propulsion system when a fault is identified. The first controller is signally connected to the second controller by substantially redundant communications buses.

9 Claims, 4 Drawing Sheets

FAULT TOLERANT CONTROL SYSTEM

CROSS-REFERENCE TO RELATED APPLICATIONS

This application claims priority from U.S. Provisional Application No. 60/608,684 filed Sep. 10, 2004, entitled FAULT TOLERANT CONTROL SYSTEM.

TECHNICAL FIELD

This invention generally relates to vehicle control systems. More particularly, this invention relates to fault-tolerant by-wire vehicle control systems.

BACKGROUND OF THE INVENTION

Vehicle systems designers are developing numerous propulsion systems to improve energy-efficiency and reduce need for consumption of fossil fuels, including fuel/electric hybrid systems having batteries and individual wheel motors, and fuel-cell systems. Each system uses one or more electronic controllers to control ongoing operation of all or part of one or more systems related to vehicle operation and propulsion. Such vehicle systems include various by-wire control systems, each consisting of an operator-controlled input device which is connected via electric wiring harness and a controller to one or more actuators. Such systems include, for example, propulsion-by-wire and brake-by-wire systems.

By-wire control systems provide a number of advantages with regard to system packaging. The associated electronic control systems and the implementation of advanced computer control algorithms facilitate numerous new control features. Much attention has been given to designing by-wire control systems and control architectures that ensure robust operation. General design techniques which have been employed in such systems are redundancy, fault tolerance to undesired events (e.g., events affecting control signals, data, hardware, software or other elements of such systems), and, fault monitoring and recovery to determine if and when such an event has occurred. A typical fault detection scheme takes or recommends action to ensure desired response and control of the vehicle. One approach to providing fault tolerance utilized in by-wire control systems is to design control systems and control architectures which ensure that no single event occurring in the system causes a complete loss of the desired control of the system.

The prior art often uses a control architecture comprising dual-redundant control systems to overcome the aforementioned concerns. FIG. 1 schematically illustrates a general dual-redundant by-wire control system 10, which comprises a fail-silent control system. The control system 10 generally comprises a pair of substantially identical controllers 11, 13 which implement substantially identical software algorithms. Each of controllers 11, 13 is adapted to provide a control signal for agreement comparison with the other. When the controller outputs agree, a control signal is provided to an actuator, smart actuator or controller for implementation of the control signal. Unless and until the controllers agree, the actuator assumes a predetermined state. Therefore, the system shown in FIG. 1 fails silent after the first fault in either controller. This behavior may be acceptable from a risk management standpoint but undesirably reduces the availability of the system. Additionally, such architecture does not address software anomalies that may manifest in systems having identity of algorithms among controllers.

Increased dependability in performance-critical by-wire systems, e.g., propulsion-by-wire ('PBW'), is typically achieved by increasing the level of hardware redundancy. However, increased levels of hardware redundancy lead to increased system cost and complexity. A single fault in a traditional dual-redundant PBW system (i.e., system with lowest level of redundancy) has the potential to lead to the loss of both the front and the rear (or other distribution) propulsion systems.

In addition, such systems typically make certain assumptions regarding occurrence of system faults, including there being a single, independent fault per communication cycle (arbitrary or fail-silent); there being no masquerading faults on a controller area network (CAN); and there being no integration of a disabled propulsion system until system reset or successful built-in-self test.

SUMMARY OF THE INVENTION

The present invention uses a novel dual-redundant propulsion-by-wire architecture with robust monitor that increase system availability without compromising safety. Dual-redundant controllers are characterized by monitors effecting cross-monitoring and self-monitoring. Self monitoring is effected at the application level and built-in system tests are performed. The monitor functions are set as high priority tasks, further increasing the level of security in the system.

In accordance with the present invention, a fault-tolerant control system for a vehicle propulsion system is provided, comprising a first controller, adapted to: control operation of a first propulsion system, monitor operation of a second controller, and, self-monitor. The second controller is adapted to control operation of a second propulsion system, monitor operation of the first controller, and, self-monitor. Each said controller operable to identify a plurality of faults occurring in the first and the second controller. The first controller operable to implement an alternate control scheme for operating the first propulsion system when a fault is identified therein. The second controller operable to implement an alternate control scheme for operating the second propulsion system when a fault is identified therein.

Another aspect of the invention is the fault-tolerant control system having the first controller signally connected to the second controller by substantially redundant communications buses.

Another aspect of the invention comprises each controller operable to execute a built-in-test capable to identify faults as a highest priority task when the controller self-monitors.

Another aspect of the invention comprises each controller operable to determine when a plurality of outputs of the alternate controller is each within a desired range when the said controller monitors operation of the alternate controller.

Another aspect of the invention comprises notifying an operator when a fault is identified by the first controller or the second controller.

Another aspect of the invention comprises the second controller operable to substantially disable operation of the second propulsion system.

A further aspect of the invention comprises the first controller operable to operate the first propulsion system when operation of the second propulsion system is substantially disabled.

Another aspect of the invention comprises the first controller operable to substantially disable operation of the first propulsion system.

A further aspect of the invention comprises the second controller operable to operate the second propulsion system when operation of the first propulsion system is substantially disabled.

Another aspect of the invention comprises the first propulsion system being a fuel-cell power system.

Another aspect of the invention comprises the first propulsion system being an internal combustion engine and driveline.

Another aspect of the invention comprises the second propulsion system being independent electric wheel motors powered by a high-voltage battery system.

The exemplary system provides benefits resulting from low levels of hardware redundancy. The diverse and robust monitors improve fault-isolation capabilities and guard against many hardware and software anomalies. The monitors combine self-check of traditional dual-redundant systems with application-specific tests and built-in-tests. Furthermore, a single fault does not result in the loss of both the front and rear propulsion systems. If the monitor on the rear controller fails silent, the front propulsion system is disabled to prevent run-away situations by a subsequent failure in the front controller. Similarly, if the monitor on the front controller fails silent, the rear propulsion system is disabled to prevent run-away situations by a subsequent failure in the rear controller. The minimal amendment of redundancy effects lower system cost, compared to the prior art.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
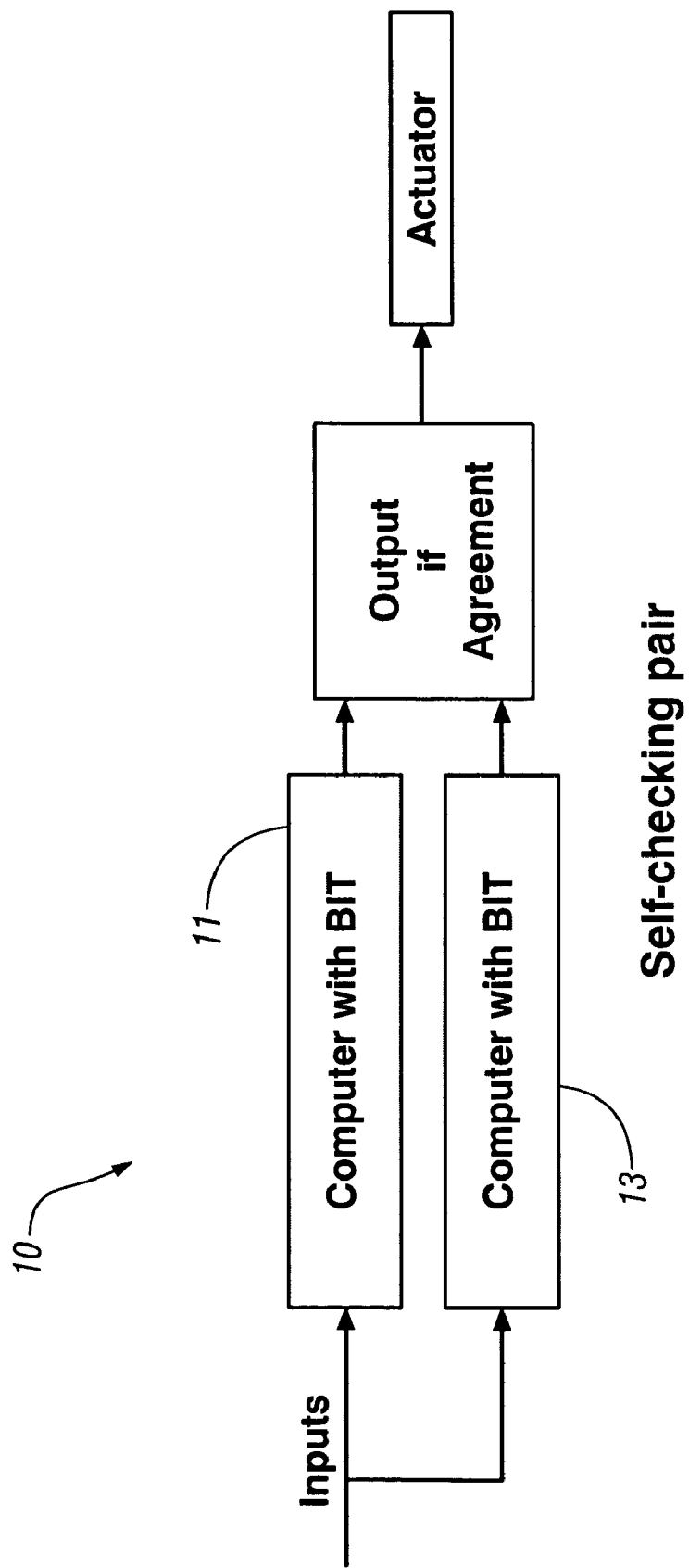
FIG. 1 is a schematic diagram of a prior art fault-tolerant control system.
Figure 2:
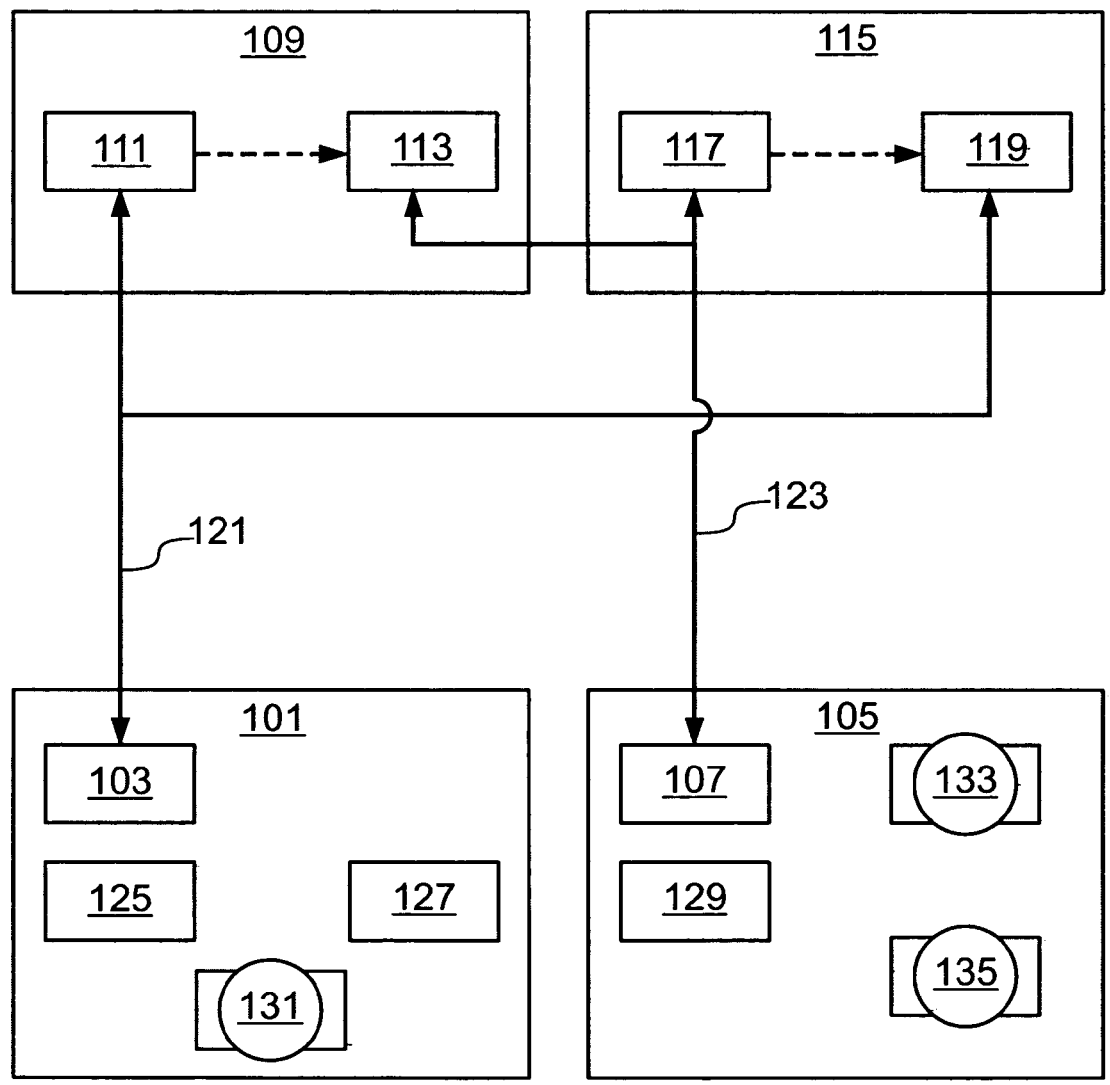
FIG. 2 is a schematic diagram of a fault-tolerant control system, in accordance with the present invention.

Referring now to the drawings, wherein the showings are for the purpose of illustrating the invention only and not for the purpose of limiting the same, FIG. 2 shows a schematic of an exemplary fault-tolerant control scheme which has been constructed in accordance with the present invention. The system includes a first system 101 including a first system control unit 103, and a second system 105 including a second system control unit 107. There is a first supervisory control module 109 including a first control 111 and a second system monitor 113 operable to monitor the second system 105. A second supervisory control unit 115 includes a second control 117 and a first system monitor 119 operable to monitor the first system 101. A first system control bus 121 is operatively coupled to the first control 111, the first system control, unit 103 and the first system monitor 119. A second system control bus 123 is operatively coupled to the second control 117, the second system control unit 107 and the second system monitor 113. The first control 111 provides a first system command to the first system control unit 103 and the first system monitor 119, and provides a virtual second system command to the second system monitor 113. The second control 117 provides a second system command to the second system control unit 107 and the second system monitor 113, and provides a virtual first system command to the first system monitor 119. The first and second system monitors are characterized by cross-monitoring, and, by self-monitoring, i.e. some form of built-in testing.

Figure 3:
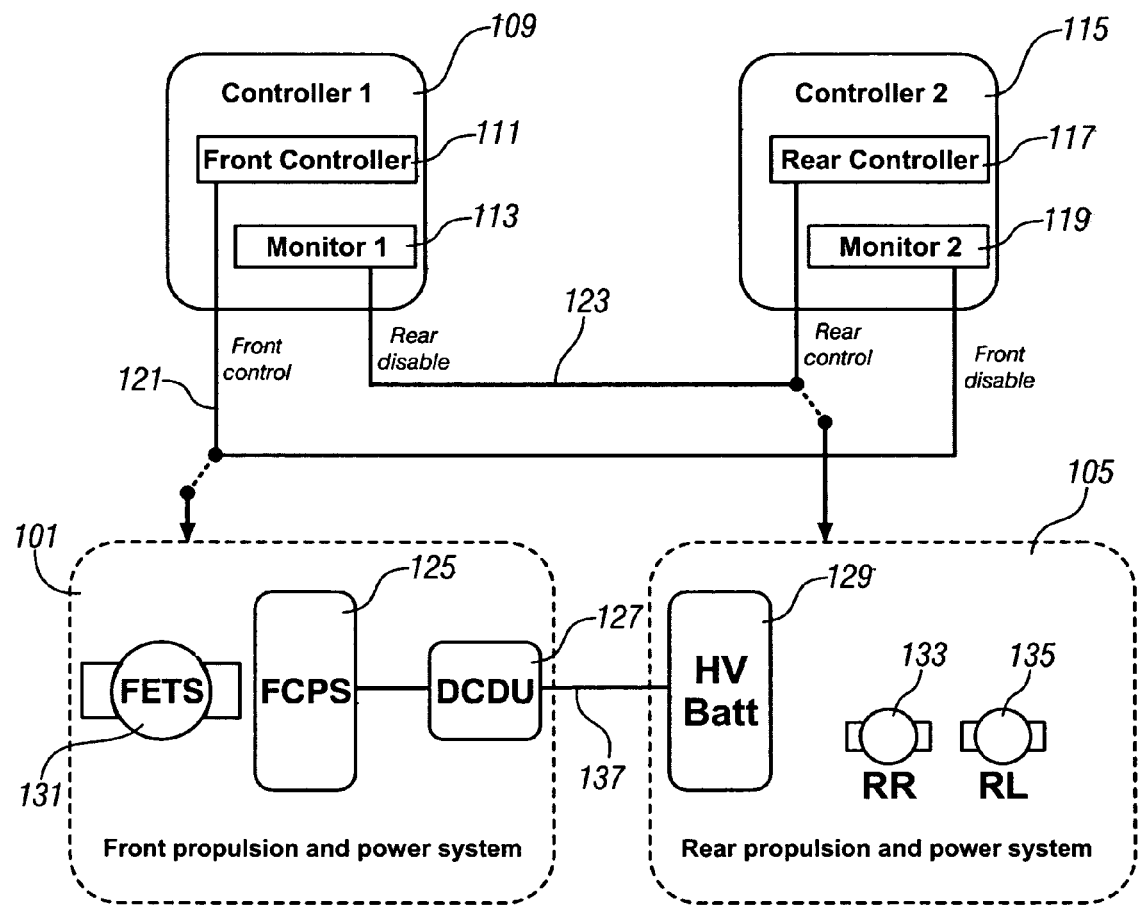
FIG. 3 is a schematic diagram of an embodiment of a fault-tolerant control system, in accordance with the present invention; and, FIG. 4 is an exemplary monitoring system, in accordance with the present invention.

Referring now to FIG. 3, a specific embodiment of the system described hereinabove, and having two associated or alternate controllers, is shown. The first system 101 is preferably a front propulsion and power system for propelling front wheels of a vehicle (not shown). The first propulsion system 101 preferably comprises a single motor front electric traction system ('FETS') 131, which is powered by a fuel-cell power system ('FCPS') 125 and includes a power distribution system ('DCDU') 127. The first propulsion system 101 is controlled by first controller 109, which includes front controller 111 and second system monitor 113. The front controller 111 is signally operably connected to the front propulsion and power system 101 via a FETS controller area network ('CAN') 121.

The second system 105 is preferably a rear propulsion and power system for propelling rear wheels of the vehicle (not shown). The second system preferably comprises a pair of rear independent electrical wheel motors 133, 135 powered by an electric energy storage system, e.g. a high voltage ('HV') battery 129. The second system 105 is controlled by second controller 115 which includes rear propulsion controller 117 and first system monitor 119. The rear propulsion controller 117 is signally operably connected to the rear propulsion system 105 via rear, or wheel motor, CAN 123. The fuel-cell power system ('FCPS') 125 and power distribution system ('DCDU') 127 are preferably operably linked to the HV battery 129 as shown by connection 137. The first system monitor 119 is signally connected to the front controller 111 of the first controller 109 via the FETS CAN 121. The second system monitor 113 is signally connected to the rear controller 117 of the second controller 115 via the rear CAN 123. The FETS CAN 121 and the rear CAN 123 preferably comprise effectively redundant bus systems by which various controllers and electronic systems are networked, permitting communications between the controllers and systems, and thus facilitating operation of each controller and system. The redundant CAN bus feature allows the system to tolerate a single communications failure without disabling the vehicle unnecessarily. Controller area networks ('CAN') are known to one skilled in the art and not discussed in detail hereinafter.

In operation, the front and rear controllers 111, 117 conduct built-in testing to identify faults that may have occurred internal to the individual controller 111, 117. Built-in testing typically comprises one or more algorithms which monitor the controller hardware, inputs/outputs of the controller, and communications buses for faults. Monitored faults typically include corrupted memory locations, overflow or corruption of memory stacks, overrun of a processor, over/under temperature conditions in the controller, over/under power supply voltage conditions, and failure of a watchdog timer. The built-in-test may include a stimulus engine, whereby the controller proactively stimulates a portion of the controller and expects a specific predetermined result to occur. If the specific predetermined result does not occur, it may indicate presence of a fault. A built-in-test monitoring algorithm typically runs on a 10 millisecond loop, and is treated as a high-priority task in the controller. A high-priority task is a task that preferably continues to execute to completion, and suspends actions of other tasks, regardless of other actions in the controller, e.g. interrupts.

Additionally, each monitor 113, 119 runs a simple and robust software monitor, which is executed in conjunction with the associated or alternate controller 117, 111. Fault coverage typically includes checking specific controller outputs to assure each output is within a desired range, i.e. rationality checks of the outputs of the monitored controller. The out-of-range check typically identifies defects resulting from defective or corrupted software. Typical fault coverage includes application divergence, i.e. run-time errors or input sensor faults, division by zero, infinity subtracted from infinity, infinity added to infinity, zero divided by zero, invalid compare operation, invalid square root calculation, or invalid integer conversion.

Figure 4:
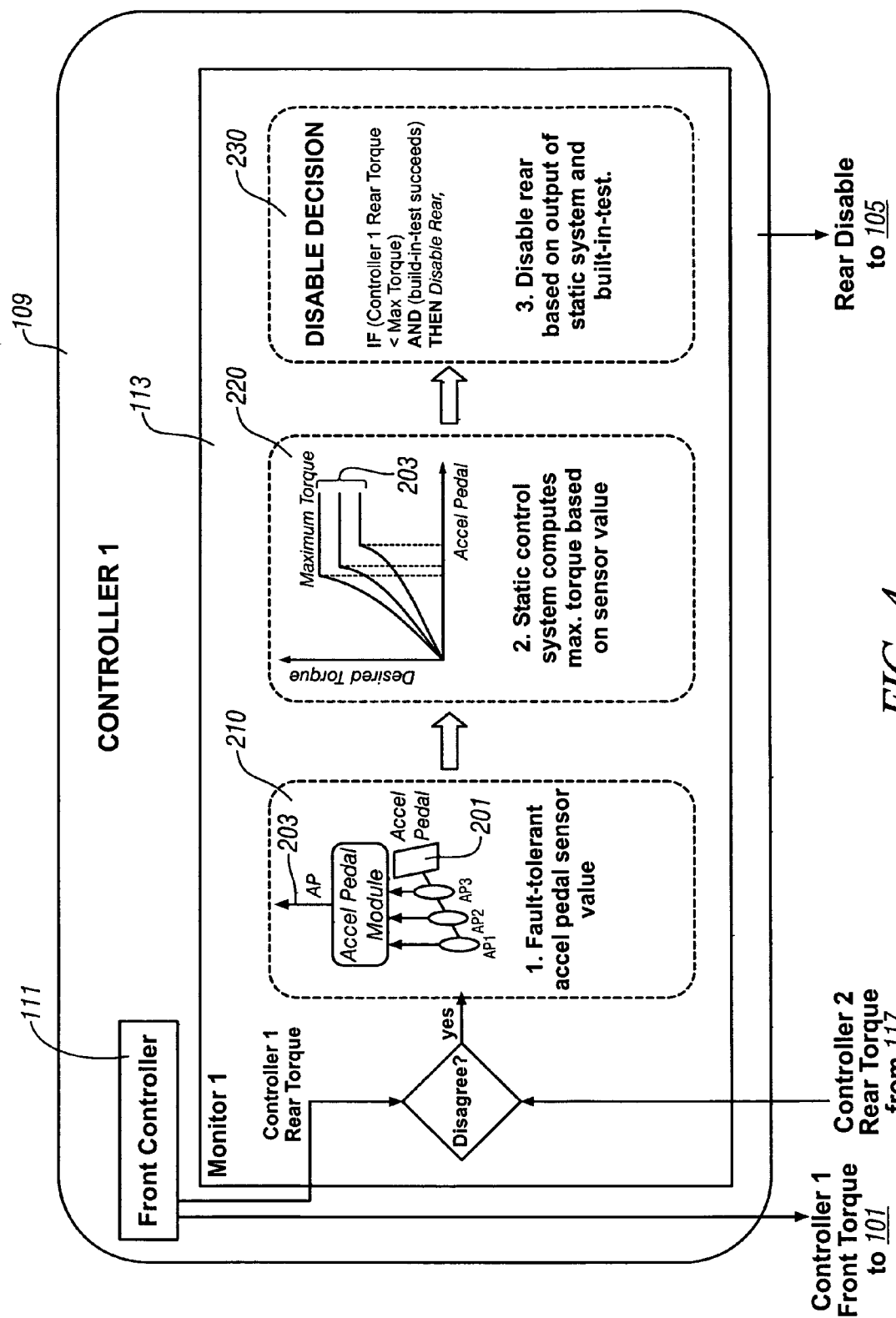

With additional reference now to FIG. 4, an exemplary software monitor is described, comprising monitoring of torque generated in the rear propulsion system 105. The front controller 109 includes the front propulsion system controller 111 and second system monitor 113, with torque control output to the front propulsion system 101. The second system monitor 113 determines rear torque, as described below. The rear controller 117 sends a signal comprising its determination of torque generated by the rear propulsion system 105 to the front monitor 113 over rear CAN bus 123. The front controller 111 provides a signal comprising its determination of rear propulsion system torque for comparison purposes, i.e. a virtual signal, determined by the second system monitor 113, as follows. The front controller 111 monitors operator input to an accelerator pedal 201 of the vehicle, and determines a fault-tolerant accelerator pedal sensor value 203, in first step 210. A maximum torque value is determined, based upon the fault-tolerant accelerator pedal sensor value 203, in second step 220. The maximum torque value is preferably based upon the position of the accelerator pedal 203 using a precalibrated table contained in software of the second system monitor 113. In the event of substantial disagreement of the torque for the rear system between the front controller 111 and rear controller 117, a decision is made to disable the rear propulsion system when the rear torque value determined by the front controller 111 is less than the maximum torque determined in step 220, as shown in step 230. This action is true, if the built-in test of the front controller 109 succeeds. Alternatively, when the torque determination from the monitor 113 of the front controller 109 substantially agrees with the torque determination from the rear controller 117, the rear propulsion system continues operation. When the determined values for rear torque disagree, as above, the second system monitor 113 indicates a fault, communicates the fault to the rear controller 117 via rear CAN bus 123, which is responsible for controlling the rear propulsion system 105 and acts to implement an alternate control scheme of the rear propulsion system 105 including disabling the rear propulsion system 105. Other such algorithms for cross-controller monitoring typically comprise other signal input-based rationality checks similar to that described hereinabove.

Combining built-in test functions with associated or alternate controller test functions provides a more complete monitoring of each controller 111, 117 for detection of faults that may occur therein. When the monitor detects a fault in the associated or alternate controller, it disables the appropriate propulsion motors and power supply.

The controllers 117, 119 may be programmed to take specific actions in the event of a single fault, and in the event of a second fault. A fault is preferably detectable in the first control module 109 including the first control 111 and second system monitor 113, the second control module 115 including the second control 117 and first system monitor 119, FETS CAN 121 and rear CAN 123. The front propulsion and power system 101 comprising the single motor front electric traction system (FETS), including the fuel-cell power system (FCPS) and power distribution system (DCDU), and the rear system 105 comprising the wheel motors and HV battery are also monitored. When a single, or first, fault, is identified, the system having the identified fault is preferably disabled. A fault may be identified by the built-in-test of the respective controller 109, 115, or by the monitor 113, 119 of the other controller 115, 109. In the event one of the controllers 111, 117 or monitors 113, 119 identifies a second fault, the respective controller may continue to operate and disable the system having the identified fault. Alternatively, occurrence of a second fault may result in a controller commanding operation in a fail-safe mode. A fail-safe operating mode may include controller-induced actions such as braking compensation during operation. Other situations are readily discernible to a skilled practitioner, and not described in further detail herein.

The present invention has been described with respect to certain exemplary embodiments. However, these embodiments are intended as non-limiting examples of the invention, it being recognized that alternative implementations are within the scope of the invention. For example, while front and rear propulsion systems have been described, each wheel of a vehicle may have its own associated electric machine for practicing the present invention. Furthermore, one of the propulsion systems may comprise an internal combustion engine with a driveline to one or more of the wheels. Accordingly, it is intended that the invention not be limited to the disclosed embodiments. It is intended that the invention includes all such modifications and alterations insofar as they come within the scope of the invention, as described in the language of the following claims.

Having thus described the invention, it is claimed:

1. Fault-tolerant control system for a vehicle utilizing a plurality of propulsion systems, comprising:
    a front propulsion system providing propelling force to said vehicle;
    a rear propulsion system providing propelling force to said vehicle;
    a first communication bus;
    a second communication bus;
    a first controller controlling operation of said front propulsion system by providing a first output signal to said front propulsion system and monitoring a second output signal from a second controller via said first communication bus; and
    said second controller controlling operation of said rear propulsion system by providing said second output signal to said rear propulsion system and monitoring the first output signal from said first controller via said second communication bus;
    wherein each of said first and second controllers identifies faults within itself through a built-in test;
    wherein each of said first and second controllers identifies faults within the other of said first and second controllers through said built-in tests based upon its respectively monitored one of said first and second output signals; and
    wherein said first and second controllers utilize said built-in tests to maintain one of said propelling forces to said vehicle despite a single fault in any of said front propulsion system, said rear propulsion system, said first communication bus, said second communication bus, said first controller, and said second controller.

2. The control system of claim 1, wherein said first and second controllers evaluate a second fault within any of said front propulsion system, said rear propulsion system, said first communication bus, said second communication bus, said first controller, and said second controller and selectively continue operation through one of said controllers without a fault.

3. The control system of claim 1, wherein each of said first and second controllers selectively disables the other of said first and second controllers based upon said identifying faults within the other of said first and second controllers and confirming no fault within the one of said first and second controllers performing said selective disabling.

4. The control system of claim 1, wherein each of said first and second controllers selectively disables itself based upon said identifying faults within itself.

5. The control system of claim 1, wherein said built-in test identifying faults within said first controller further identifies faults within said first communication bus and said front propulsion system; and wherein said built-in test identifying faults within said second controller further identifies faults within said second communication bus and said rear propulsion system.

6. The control system of claim 5, wherein one of said built-in tests further identifies faults within an energy storage device connected to one of said propulsion systems.

7. The control system of claim 1, wherein said built-in tests identifying faults within said other of said first and second controllers further identifies faults within said communication bus and front propulsion system connected to said other controller.

8. The control system of claim 1, wherein one of said controllers selectively commands a fail-safe mode based upon said built-in tests identifying a plurality of faults.

9. The system of claim 1, wherein said first controller controlling operation of said front propulsion system comprises said first controller determining a first maximum torque value to control said front propulsion system; wherein said second controller controlling operation of said rear propulsion system comprises said second controller determining a second maximum torque value to control said rear propulsion system; and wherein each of said first and second controllers identifying faults within the other of said first and second controllers through said built-in tests comprises:

the first controller determining a virtual signal for the rear propulsion system;

the first controller comparing the second maximum torque value to the virtual signal for the rear propulsion system and indicating a fault based upon the comparing indicating that the second maximum torque value is greater than the virtual signal for the rear propulsion system; the second controller determining a virtual signal for the front propulsion system; and the second controller comparing the first maximum torque value to the virtual signal for the front propulsion system and indicating a fault based upon the comparing indicating that the first maximum torque value is greater than the virtual signal for the front propulsion system.

* * * * *